Sept. 16, 1969  E. F. GOURLEY  3,467,416
BLADE LOCKING DEVICES
Filed Nov. 3, 1967
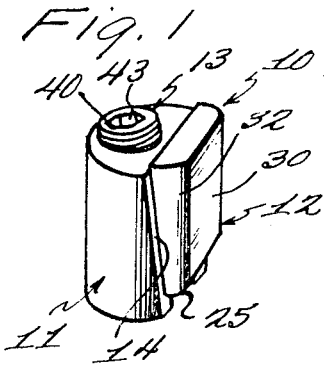
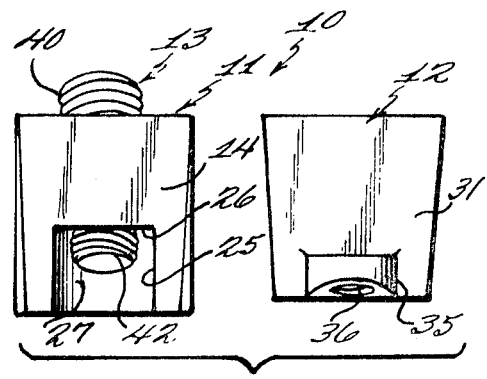
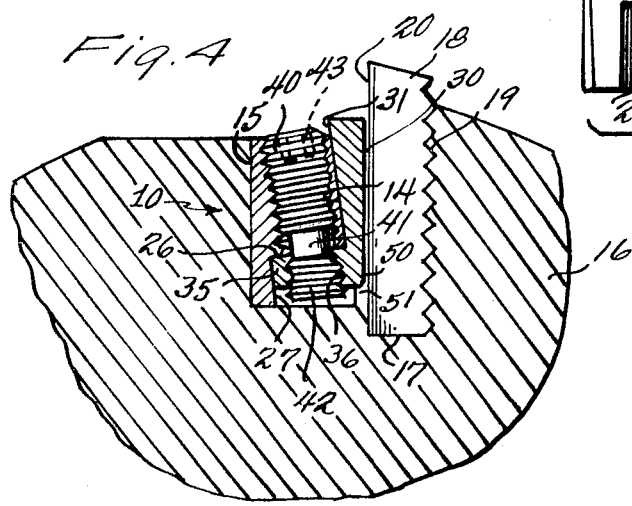
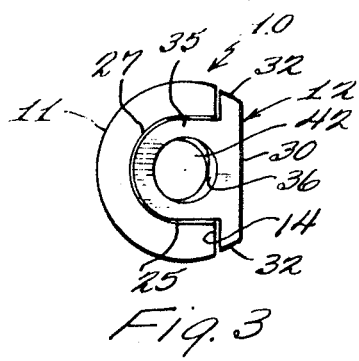
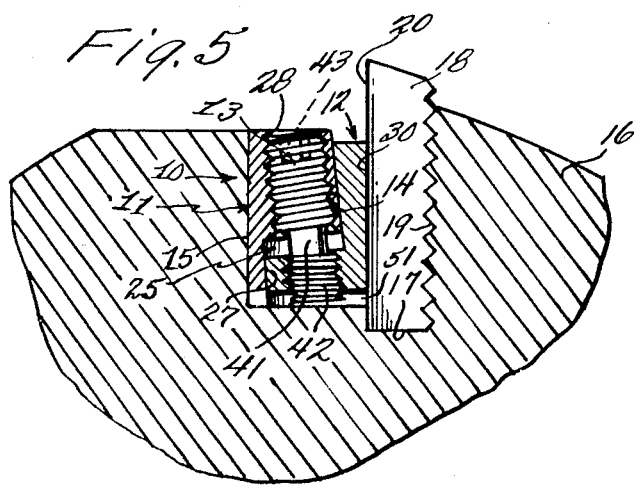
INVENTOR
EUGENE F. GOURLEY
ATTORNEY United States Patent Office 3,467,416
Patented Sept. 16, 1969

3,467,416
BLADE LOCKING DEVICES
Eugene F. Gourley, Meadville, Pa., assignor to McCrosky Tool Corporation, Meadville, Pa., a corporation of Pennsylvania
Filed Nov. 3, 1967, Ser. No. 680,582
Int. Cl. F16b 1/00
U.S. Cl. 287—189.36                        8 Claims

ABSTRACT OF THE DISCLOSURE

A wedging blade-locking device constituted by a truncated cylindrical cartridge adapted to be seated in a recess in the body of a cutter, which recess is adjacent to the blade which is to be locked within the cutter body. The partial lateral surface of the cylindrical cartridge remote from the blade coincides with a corresponding cylindrical surface in the cutter body, which together with a reciprocable wedge element overlying a flat-sided inclined face of said cartridge proximate to said blade, substantially fills said recess. A threaded screw, of relatively large diameter and of different pitch at the different portions thereof, engages internal differentially threaded coaxial bores in the cartridge and a projection extending laterally from said wedge element into an opening in said cartridge, to effect the reciprocation of said wedge element between the blade and cartridge to lock or release the latter quickly and reliably against the blade.

---

The invention relates to an expansible and contractible blade locking device of the unitary cartridge type adapted in the contracted condition thereof to be slidably inserted into and removed from a recess in a cutter body which opens into the blade receiving slot or seat thereof, comprising an elongated carrier member of cylindrical shape except for a flat side wedging face that is inclined to the axis of the carrier member, an elongated wedge element of substantially the same width and length as the carrier member disposed in juxtaposed relation to the carrier member and having a side wedging face complemental to and contacting the side wedging face of the carrier member and a flat blade-engageable side face parallel to the opposed face of the cutting blade, and an actuating screw rotatably mounted in the carrier member and the wedge element for moving the wedge element lengthwise in opposite directions with respect to the carrier member to effect lateral expansion and contraction of the device into and out of locking engagement with the cutting blade and the wall of the cutter body recess.

This invention relates to a contractible and expansible unitary cartridge type locking device for releasably locking or clamping insertible cutting blades or bits in milling cutter, reamers, boring bars, lathe tools, shaper tools, and the like.

Cartridge type locking devices have hitherto been known for the above identified purpose, but have been subject to various disadvantages according to the constructions. In some constructions, for example, the arrangement is such that only a very small actuating screw may be utilized, requiring the use of a relatively small and difficult to handle wrench.

In others, the locking or bearing face of the wedge element has been relatively narrow or short in comparison to the width and length of the device, resulting in contact of reduced area of the wedge element with the blade.

In still others, the operation has been relatively slow. In still others, the device has been subject to accidental disassembly, while in contrast other types have been very difficult to disassemble intentionally for the replacement of parts.

An important object of the instant invention is to provide a blade locking device which incorporates a wedge element having a blade contacting or bearing face which extends for substantially the full width and length of the device to assure firm securement of the cutting blade in operating position.

Another object of the invention is the provision of a locking device embodying a relatively large actuating screw affording great strength and force in effecting the desired locking action and permitting the use of a relatively large and easily handled wrench.

A further object of the invention is the provision of a locking device which cannot become disassembled accidentally but which may be readily intentionally disassembled when desired for the replacement of any of the components thereof.

An additional object of the invention is the provision of a locking device which will provide for increased expansion in comparison with hitherto known types, and which may be rapidly and expeditiously moved into and out of locking engagement with the cutting blade.

Other objects and advantages of the present invention will be apparent from the following detailed description of the preferred embodiment thereof when considered in conjunction with the accompanying drawing, in which:

FIGURE 1 is a perspective view of the unitary cartridge locking device of the instant invention;

FIGURE 2 is an exploded elevational view showing the carrier body and the wedge element in disassembled relation;

FIGURE 3 is a bottom plan view of the assembled device;

FIGURE 4 is a transverse section through a portion of a cutter body showing an insertible blade in association with the locking device of this invention in free or non-locking position; and FIGURE 5 is a view similar to FIGURE 4 but showing the improved locking device in blade locking position.

With continued reference to the drawing, the unitary cartridge type locking device of the present invention, which in its contracted condition is adapted for slidable insertion into and removal from a partially cylindrical recess in a cutter body that opens into the blade-receiving slot or seat thereof, is generally designated 10 and comprises essentially a main body or carrier member 11, a wedge element 12, and an actuating screw 13.

The carrier or body member 11 is cylindrical in shape, except that it is truncated by a flat side face 14 which is inclined at a wedging angle to the axis thereof, and conforms to the cylindrical curvature of a recess 15 in a cutter body 16 of the rotary or stationary type that is parallel to and opens into the blade-receiving slot or seat 17 of the cutter body in which is positioned a cutting blade 18. The rear walls or faces of the cutting blade 18 and the slot 17 are here shown as being provided with interfitting serrations 19 in aid of adjustment and retention of the blade in fixed position, while the front face or wall 20 of the blade is substantially flat and smooth. It is to be understood however, that the blade 18 may be in the form of a relatively thin carbide bit or insert in which case both the front and rear walls thereof, as well as the opposed wall of its receiving slot, will be substantially flat and smooth.

In the lower portion of the carrier member 11 there is formed a laterally opening socket 25 which may extend for approximately half the length of the carrier member and includes a top wall 26 and an arcuate side wall 27. The upper major portion of the carrier member is provided with a generally longitudinally extending bore 28 of relatively large diameter which is internally threaded, and preferably with right-hand threads. The bore 28 is preferably, although not necessarily, inclined to the axis of the carrier member.

The wedge element 12, which is generally rectangular and flat in shape and of substantially the same length and width as the carrier member, is disposed in juxtaposed relation to the carrier member 11. It has a flat outer blade-engageable face 30 which is parallel to and adapted for full bearing contact with the front face 20 of the cutting blade 18 in the operative locking position of the device. The inner face 31 of the wedge element 12 is also flat, and inclined in a direction opposite to the inclination of the wedge face 14 of the carrier member with which it contacts and coacts when the wedge element is moved axially in opposite directions with respect to the carrier member by the actuating screw 13 to effect lateral expansion and contraction of the device into and out of locking engagement with the cutting blade 18 and the wall of the cutter body recess 15. The side edges 32 of the wedge element are rounded to approximate the cylindrically shaped exterior surface of the carrier member 11, but are narrower than the wedge face 14, as shown in FIGURE 1, to prevent the locking of the wedge element in the recess before the full engagement with the cutting blade is attained. This is also indicated in FIGURE 3 showing the wedge in locked position.

The wedge element 12 is provided with an integral laterally projecting lug 35 at the lower portion of its inner face 35 which is slidably received in the socket 25 of the carrier member 11 with which its exterior surface conforms. The lug 35 is formed with a threaded bore 36 extending entirely therethrough and disposed in longitudinal alignment with the threaded bore 28 in the carrier member 11 for the reception of the rotatable actuating screw 13. The threads in the bore 36 are preferably left-handed but in any case are opposite in hand to the threads in the bore 28 of the carrier member 11.

The rotatable actuating screw 13 consists of a relatively large diameter upper section or portion 40 provided with threads of a hand corresponding to the threads in the bore 28 of the carrier member 11, an unthreaded intermediate portion 41 of reduced diameter, and a lower threaded portion 40, also of reduced diameter, and having threads corresponding to the threads of the bore 36 in the lug 35 of the wedge element 12. The thread arrangement herein shown—right-hand threads on the upper portion 40 of the screw and left-hand threads on the lower reduced portion 42 thereof—provides for the rapid expansion and contraction of the device into and out of locking engagement with the cutting blade 18 upon rotation of the actuating screw in clockwise and counterclockwise directions. A reverse thread arrangement may be employed. In other words, the threads in the bore 28 and on the screw section 40 may be left-handed and the threads in the bore 36 and on the screw section 42 right-handed, in which case counter-clockwise rotation of the screw would effect locking and clockwise rotation thereof would effect unlocking of the device. The upper exposed end of the rotatable actuating screw 13 is provided with a polygonal socket 43 for the reception of a suitable turning tool or wrench.

The operation of the device is believed to be apparent from the foregoing description and the accompanying drawing. However, in the interest of clarity and ready understanding, it will now be briefly described. The device in its contracted condition is inserted into the cutter body recess 15, with the parts occupying the position shown in FIGURE 4 wherein the upper end of the wedge element 12 projects above the upper end of the carrier member 11 and the blade-engageable face 30 of the wedge element 12 is spaced from the opposed front face 20 of the cutting blade 18, as indicated at 50. To effect locking action, the screw 13 is rotated by a suitable tool or wrench in a clockwise direction to move the wedge element downwardly which due to the coaction between the wedging faces 14 and 31 forces the wedge element into tight engagement with the confronting face 20 of the cutting blade and the carrier member into tight locking engagement with the wall of the cutter body recess 15.

It will be seen that the wedge element cannot be accidentally disassembled during the process of unlocking, since the lug 35 will contact the top wall 26 of the socket 25 in the carrier member, and can go no farther. It will also be seen that by reverse or counterclockwise rotation of the actuating screw 13, when the device is removed from the recess 15, ready disassembly of the components may be accomplished.

It will also be seen that since the wedge element 12 and the blade-engageable face 30 thereof are of substantially the same length and width as the carrier member 11, the wedge element has generous bearing or locking contact with the cutting blade in the operative locking position of the device.

While this invention has been described with reference to a specific embodiment, it will be understood that this embodiment is merely exemplary and that departures therefrom may be made.

I claim:

1. An expansible and contractible locking device of the unitary cartridge type for locking a cutting blade in a slot therefor in a cutter body having a partial cylindrical recess opening into the blade slot, said device in its contracted condition being adapted for slidable insertion into the removal from the cutter body recess, comprising, (a) a truncated cylindrical carrier member having a single flat sided wedging face inclined to the axis of said carrier member, a threaded bore extending lengthwise thereof, and a socket extending inwardly from said flat side, said flat sided wedging face defining the major part of said cylindrical carrier member which flares from one end to the other, (b) a reciprocable wedge element in juxtaposed and overlapping relation to said carrier member having an inclined inner flat-sided wedging face mated to the wedging face of said carrier member, an outer side blade-engageable face complemental to the opposed face of the cutting blade, and a laterally projecting lug slidably disposed in the socket of said carrier member and having a bore aligned with the threaded bore in said carrier member and provided with threads of a hand opposite those in the bore of said carrier member, said wedge element and the inner and outer faces thereof being of substantially the same length and width as said carrier member to provide for generous locking contact between said wedge element and the cutting blade in the operative locking position of the device, and (c) a rotatable actuating screw for said wedge element mounted in the aligned threaded bores of said carrier member and the lug of said wedge element and having upper and lower threaded sections of opposite hands corresponding to the threads in said bores for effecting rapid movement of said wedge element into and out of locking engagement with the cutting blade and the wall of the cutter body recess as said flat-sided inner wedging face of said wedge element reciprocates relatively to the flat-sided wedging face of said carrier member.

2. The invention as defined in claim 1 wherein the threaded bore in said carrier member is of greater diameter than the threaded bore in the lug of said wedge element, and the diameters of the threaded sections of said actuating screw correspond to the diameters of their associated bores.

3. The invention as defined by claim 2 wherein said actuating screw and said threaded bores are inclined relative to the axis of said carrier member.

4. The invention as defined by claim 1 wherein the lug on said wedge element abuts the top wall of the socket in said carrier member when said actuating screw is rotated to a certain extent in a direction effecting contraction of the device to prevent disconnection of said wedge element from said actuating screw.

5. The invention as defined by claim 1 wherein the socket in said carrier member extends for approximately half the length of said carrier member and the threaded bore in said carrier member extends entirely through the remainder thereof.

6. The invention as defined by claim 1 wherein said wedge element is slightly shorter than said carrier member to prevent contact of its lower end with the bottom of the cutter body recess when the wedge element is moved downwardly to locking position.

7. The invention as defined by claim 6 wherein the opposite lateral walls of said wedge element are spaced slightly less than the opposite edges of said flat side wedging face of said carrier member, to preclude locking of said lateral walls to the cylindrically shaped recess prior to the complete locking of the blade-engageable face of said wedge element to the locking blade.

8. A device as defined in claim 1, wherein said inwardly extending socket is disposed at the lower portion of said cylindrical carrier member, whereat the latter is of greater thickness than at the opposite end, by virtue of the inclination of the flat-sided wedging face of said carrier member relative to the axis thereof, and said wedge element is thickest at said opposite end between said inner and outer faces thereof.

References Cited

UNITED STATES PATENTS

| | | | |
|---|---|---|---|
| 1,681,675 | 8/1928 | Miller | 29—105 |
| 2,096,472 | 10/1937 | Schmidt | 144—230 X |
| 2,435,287 | 2/1948 | Miller. | |
| 2,547,789 | 4/1951 | Skeel | 85—79 X |
| 2,584,449 | 2/1952 | Höglund. | |
| 2,632,536 | 3/1953 | Skeel. | |
| 2,751,006 | 6/1956 | Lane | 29—105 X |
| 2,996,158 | 8/1961 | Greenleaf. | |

FOREIGN PATENTS

| | | |
|---|---|---|
| 1,012,270 | 7/1957 | Germany. |
| 992,542 | 5/1965 | Great Britain. |

CARL W. TOMLIN, Primary Examiner

WAYNE L. SHEDD, Assistant Examiner

U.S. Cl. X.R.

29—105; 144—230; 287—52.09

PO-1050
(5/69)

UNITED STATES PATENT OFFICE
CERTIFICATE OF CORRECTION

Patent No. 3,467,416      Dated September 16, 1969

Inventor(s) EUGENE F. GOURLEY

It is certified that error appears in the above-identified patent and that said Letters Patent are hereby corrected as shown below:

Claim 1, column 4, line 28, "the", first occurrence, should be --and--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents